(12) United States Patent
Jan

(10) Patent No.: US 8,952,080 B2
(45) Date of Patent: Feb. 10, 2015

(54) MATERIAL FOR CONTACT LENSES, METHOD FOR MANUFACTURING CONTACT LENSES AND CONTACT LENSES OBTAINED THEREBY

(71) Applicant: BenQ Materials Corporation, Taoyuan County (TW)

(72) Inventor: Fan-Dan Jan, Taoyuan County (TW)

(73) Assignee: Benq Materials Corporation, Taoyuan County (TW)

( * ) Notice: Subject to any disclaimer, the term of this patent is extended or adjusted under 35 U.S.C. 154(b) by 74 days.

(21) Appl. No.: 13/845,114

(22) Filed: Mar. 18, 2013

(65) Prior Publication Data

US 2014/0221523 A1 Aug. 7, 2014

(30) Foreign Application Priority Data

Feb. 7, 2013 (TW) ............................. 102104757 A

(51) Int. Cl.

| | | |
|---|---|---|
| *C08L 83/00* | (2006.01) | |
| *C08L 101/14* | (2006.01) | |
| *G02B 1/04* | (2006.01) | |
| *C08F 230/08* | (2006.01) | |
| *C08L 83/08* | (2006.01) | |
| *C08G 77/20* | (2006.01) | |
| *C08G 77/26* | (2006.01) | |
| *C08G 77/388* | (2006.01) | |

(52) U.S. Cl.
CPC .............. *G02B 1/043* (2013.01); *C08F 230/08* (2013.01); *C08L 83/08* (2013.01); *C08G 77/20* (2013.01); *C08G 77/26* (2013.01); *C08G 77/388* (2013.01)
USPC ........................................................ 523/107

(58) Field of Classification Search
None
See application file for complete search history.

(56) References Cited

U.S. PATENT DOCUMENTS

| | | | | | |
|---|---|---|---|---|---|
| 4,153,641 | A | * | 5/1979 | Deichert et al. ............... | 526/264 |
| 4,327,203 | A | * | 4/1982 | Deichert et al. ............... | 526/279 |
| 4,355,147 | A | * | 10/1982 | Deichert et al. ............... | 526/264 |
| 4,910,277 | A | * | 3/1990 | Bambury et al. .............. | 526/260 |
| 8,490,782 | B2 | * | 7/2013 | Zhao et al. ...................... | 206/5.1 |
| 2005/0124776 | A1 | * | 6/2005 | Lai et al. .......................... | 528/25 |
| 2008/0004413 | A1 | * | 1/2008 | Schorzman et al. ............ | 528/26 |
| 2013/0056889 | A1 | * | 3/2013 | Jan ................................. | 264/1.1 |

OTHER PUBLICATIONS

Result of STN search, case U.S. Appl. No. 13/845,114, Nov. 5, 2014.*

* cited by examiner

*Primary Examiner* — James J Seidleck
*Assistant Examiner* — Peter A. Salamom
(74) *Attorney, Agent, or Firm* — CKC & Partners Co., Ltd.

(57) ABSTRACT

The invention provides a material for contact lenses, including a first siloxane macromer with the number average molecular weight of about 1,000 to 10,000, wherein the first siloxane macromer has a crosslinking function and is represented by the following formula (I):

formula (I)

$$O=C-R_6-C-R_5-R_4-Si-(O-Si)_n-O-Si-R_4-R_5-C-R_6-C=O;$$
(with substituents $R_7, R_8, R_1, R_2, R_3$)

a second siloxane macromer is selected from the group consisting of a siloxane macromer represented by the following formula (II) and a siloxane macromer represented by the following formula (III):

formula (II)

$$C_4H_9-Si(CH_3)_2-(O-Si(CH_3)_2)_p-O-Si(CH_3)_2-CH_2CH_2CH_2-O-C(=O)-C(CH_3)=CH_2$$

formula (III)

$$C_4H_9-Si(CH_3)_2-(O-Si(CH_3)_2)_q-O-Si(CH_3)_2-C_3H_6OC_2H_4O-C(=O)-NH-\cdots$$

at least one hydrophilic monomer; and an initiator.

16 Claims, No Drawings

MATERIAL FOR CONTACT LENSES, METHOD FOR MANUFACTURING CONTACT LENSES AND CONTACT LENSES OBTAINED THEREBY

CROSS-REFERENCE TO RELATED APPLICATION

This application claims the priority benefit of Taiwan Application Serial No. 102104757, filed on Feb. 7, 2013, the full disclosure of which is incorporated herein by reference.

BACKGROUND

1. Technical Field

The present invention relates to a composition for manufacturing contact lenses. More particularly, the present invention relates to a composition for manufacturing contact lenses comprising a silicone polymeric material with hydrophilic functional end-caps having excellent oxygen permeability and water content.

2. Description of Related Art

The hydrogel contact lenses are made from hydrogel materials, such as poly-2-hydroxyethyl methacrylate (p-HEMA), which can be improved in strength by adding crosslinking agent like ethylene glycol dimethacrylate (EGDMA). Since the water content of the p-HEMA is only about 38.8%, the hydrophilic monomer, for example N-vinylpyrrolidone (NVP), N,N-dimethylacrylamide (DMA) and methyl acrylic acid, is added to improve the water content of such materials for the contact lenses. With the addition of the hydrophilic monomer, the water content of the contact lenses can increase up to 80%. However, the higher water content of the contact lenses is, the lower tension and toughness thereof become. Therefore, the water content of contact lenses is generally controlled in the range from about 45% to 58%.

Silicone hydrogel contact lenses comprise a hydrophilic silicone polymeric material which was made by polymerizing two siloxane macromers, which have to different chemical structures and different molecular weights, and a hydrophilic monomer, such as N-vinylpyrrolidone (NVP), methyl acrylic acid (MAA) and N,N-dimethylacrylamide (DMA).

However, due to the hydrophobic characteristic on the surface of silicone hydrogel contact lenses, it is apt to incur the bacteria breed and eyes irritation. Therefore, it demands to provide a composition of contact lenses and a method for manufacturing contact lenses with enhancing the hydrophilicity of the contact lenses.

SUMMARY

According to an aspect of the present invention, a composition for manufacturing contact lenses is provided.

The composition for manufacturing contact lenses comprises a first siloxane macromer with the number average molecular weight of 1,000 to 10,000, represented as bellow and having a cross-linking function, formula (I)

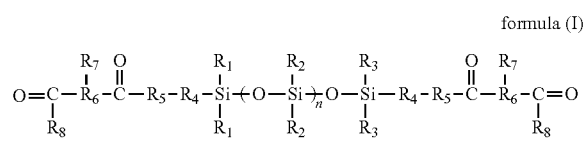

wherein In formula (I), $R_1$, $R_2$ and $R_3$ are independently $C_1$-$C_4$ alkyl group, $R_4$ is $C_1$-$C_6$ alkenylene group, $C_1$-$C_6$ alkylene group, or $C_1$-$C_6$ alkylene substituted with ether group, $R_5$ is O or NH, $R_6$ is $C_1$-$C_6$ alkenylene group, $C_1$-$C_6$ alkylene group or $C_1$-$C_6$ alkylene substituted with ether group, $R_7$ is H, $C_1$-$C_6$ alkylene group or $C_1$-$C_6$ alkylene substituted with ether group, $R_8$ is a residue of reactive functional group with hydroxyl group, carboxyl group, epoxy group or acid anhydride group, and n is a integer of 10 to 100; a second siloxane macromer is selected from the group consisting of a siloxane macromer represented by the following formula (II) and a siloxane macromer represented by the following formula (III), formula (II)

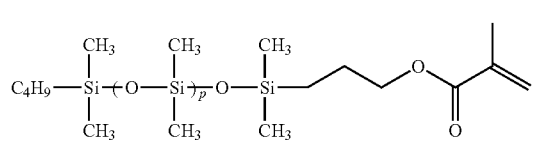

formula (III)

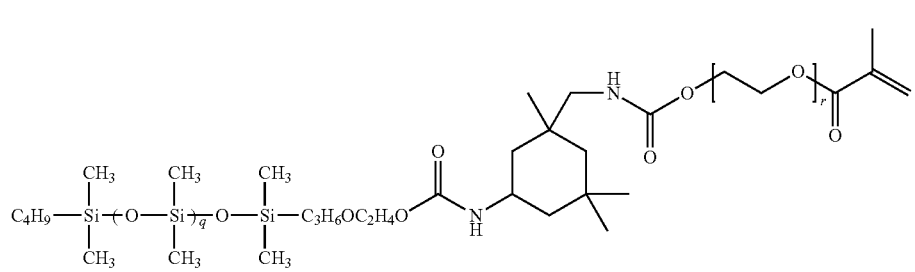

wherein in formula (II), p is an integer of 4 to 80, and in formula (III), q is an integer of 4 to 80 and r is an integer of 3 to 40; at least one hydrophilic monomer and an initiator.

In an embodiment of the present invention, the hydrophilic monomer is selected from a group consisting of N-vinylpyrralidone (NVP), 2-hydroxyethyl methacrylate (HEMA), N,N-dimethylacrylamide (DMA), methyl acrylic acid, acrylic acid; glycidyl methacrylate (GMA), (methyl)acrylamide, 2-(N,N-dimethylamino) ethyl methacrylate (DMAEMA), vinyl acetate, 2-(Dimethylamino)ethyl methacrylate, N-acrylolmorpholine and a combination thereof.

According to a further another aspect of the present invention, a method for manufacturing the contact lenses is provided.

The method for manufacturing contact lenses comprising the following steps. First, a first siloxane macromer, a second siloxane macromer, at least one hydrophilic monomer, an initiator and a solvent are mixed to form a mixture. Then the mixture is injected into a mold of contact lens and conducted by a thermal treatment or a UV irradiating treatment to form contact lenses. Wherein, is the number average molecular weight of the first siloxane macromer represented by the following formula (I), is 1,000 to 10,000 and the first siloxane macromer has a cross-linking function.

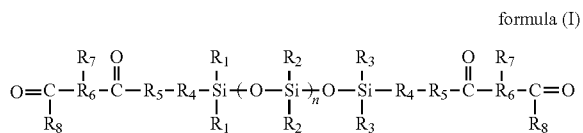

formula (I)

In formula (I), $R_1$, $R_2$ and $R_3$ are independently $C_1$-$C_4$ alkyl groups, $R_4$ is $C_1$-$C_6$ alkenylene group, $C_1$-$C_6$ alkylene group, or $C_1$-$C_6$ alkylene substituted with ether group, $R_5$ is O or NH, $R_6$ is $C_1$-$C_6$ alkenylene group, $C_r$—$C_6$ alkylene group or $C_1$-$C_6$ alkylene substituted with ether group, $R_7$ is H, $C_1$-$C_6$ alkylene group or $C_1$-$C_6$ alkylene substituted with ether group, $R_8$ is a residue of reactive functional group with hydroxyl group, carboxyl group, epoxy group or acid anhydride group, and n is a integer of 10 to 100.

The second siloxane macromer is selected from the group consisting of a siloxane macromer represented by the following formula (II) and a siloxane macromer represented by the following formula (III).

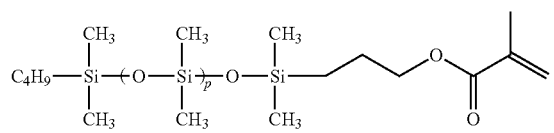

In formula (II), p is an integer of 4 to 80, and in formula (III), q is an integer of 4 to 80 and r is an integer of 3 to 40.

Moreover, the hydrophilic monomer is selected from a group consisting of N-vinylpyrrolidone (NVP), 2-hydroxyethyl methacrylate (HEMA), NN-dimethylacrylamide (DMA), methyl acrylic acid, acrylic acid (MAA), glycidyl methacrylate (GMA), (methyl)acrylamide, 2-(N,N-dimethylamino) ethyl methacrylate (DMAEMA), vinyl acetate, 2-(Dimethylamino)ethyl methacrylate, N-acrylolmorpholine and a combination thereof.

According to a further another aspect of the present invention, a contact lens obtained by the method mentioned above is provided.

The above and other aspects of the invention will become better understood with regard to the following detailed description of the preferred but non-limiting embodiment(s).

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

According to an aspect of the present invention, the present invention provides a composition for manufacturing contact lenses comprising a silicone polymeric material with hydrophilic functional group end-caps. The contact lenses obtained by the method have an enhanced hydrophilic surface, excellent oxygen permeability and suitable water content In an embodiment of the present invention, the composition for manufacturing contact lenses comprising a first siloxane macromer, represented by the following formula (I), a second siloxane macromer is selected from the group consisting of a siloxane macromer represented by the following formula (II) and a siloxane macromer represented by the following formula (II), at least one hydrophilic monomer and a initiator, wherein the first siloxane macromer of formula (I) has the number average molecular weight of 1,000 to 10,000 and has a cross-linking function. The formula (I) is shown as follows:

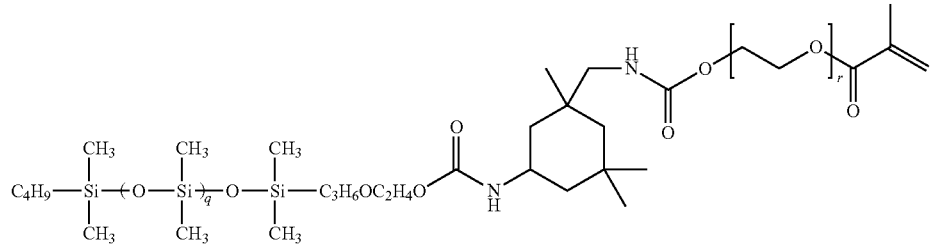

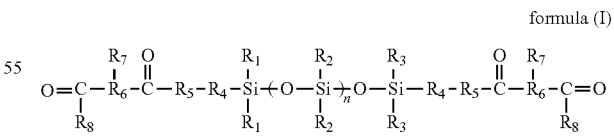

formula (I)

in formula (I), $R_1$, $R_2$ and $R_3$ are independently $C_1$-$C_4$ alkyl group, $R_4$ is $C_1$-$C_6$ alkenylene group, $C_1$-$C_6$ alkylene group, or $C_1$-$C_6$ alkylene substituted with ether group, $R_5$ is O or NH, $R_6$ is $C_1$-$C_6$ alkenylene group, $C_1$-$C_6$ alkylene group or $C_1$-$C_6$ alkylene substituted with ether group, $R_7$ is H, $C_1$-$C_6$ alkylene group or $C_1$-$C_6$ alkylene substituted with ether group, $R_8$ is a residue of reactive functional group with hydroxyl group, carboxyl group, epoxy group or acid anhydride group, and n is a integer of 10 to 100.

The second siloxane macromer is selected from the group consisting of a siloxane macro epresented by the following formula (II) and a siloxane macromer represented by the following formula (III), wherein in formula (II), p is an integer of 4 to 80, and in formula (III), q is an integer of 4 to 80 and r is an integer of 3 to 40. The formula (II) and the formula (III) are shown as follows:

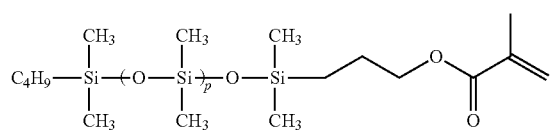

formula (II)

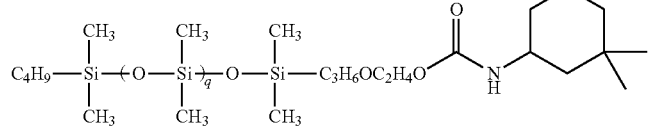

formula (III)

In the embodiment of composition for manufacturing contact lenses of the present invention aforementioned, the first siloxane macromer is present at an amount of 5 to 35 parts by weight, the second siloxane macromer is present at an amount of 30 to 50 parts by weight, the hydrophilic monomer is present at an amount of 5 to 60 parts by weight, preferable in 30 to 60 parts by weight, and the initiator is present at an amount of 0.5 to 0.7 parts by weight based on the total amount of the composition.

In an embodiment of the present invention, the first siloxane macromer represented by the above formula (I), comprises a siloxane macromer represented by the following formula (IV) or a siloxane macromer represented by the following formula (V):

vinyl acetate 2-(Dimethylamino)ethyl methacrylate, N-acrylolmorpholine and a combination thereof.

In an embodiment of the present invention, the hydrophilic monomer is a combination of 2-hydroxyethyl methacrylate (HEMA) and N-vinylpyrrolidone (NVP), a combination of 2-hydroxyethyl methacrylate (HEMA) and N,N-dimethylacrylamide (DMA), a combination of N-vinylpyrrolidone (NVP) and N,N-dimethylacrylamide (DMA) or a combination of a N-vinylpyrrolidone (NVP), 2-hydroxyethyl methacrylate (HEMA) and N,N-di ethylacrylamide (DMA).

Besides, the initiator suitably used in conventional for manufacturing contact lenses can be used in the composition of the present invention, can be a thermal initiator or a photoinitiator. The suitable thermal initiator, can be not limited to, such as, for example, azobisisoheptonitrile, 2,2'-azobis (isobutyronitrile) (AIBN), 2,2'-azobis(2,4-dimethylvaleronitrile), 2,2'-azobis(2-methyl-prop nenitrile), 2,2'-azobis(2-methyl-butanenitrile). The suitable photoinitiator, can be not limited to, such as, for example, 2-Hydroxy-2-methylpropiophenone, 1-Hydroxycyclohexyl phenyl ketone, 22-Dimethoxy-2-phenylacetophenone, Benzoin methyl ether, 2,2'-azobis-isobutyronitrile or 2,2-Diethoxyacetophenone.

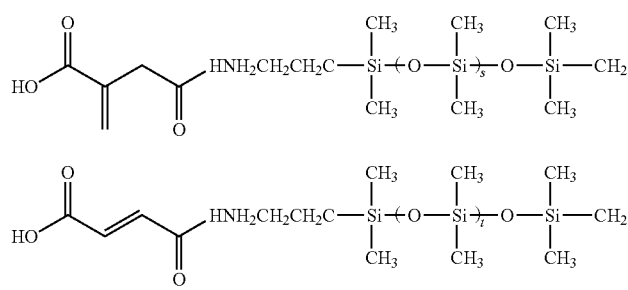

formula (IV)

formula (V)

wherein in formula (IV), s is an integer of 10 to 100, and in formula (V), t is an integer of 10 to 100.

In an embodiment of the present invention, the hydrophilic monomer can be but not limited to, N-vinylpyrrolidone (NVP), 2-hydroxyethyl methacrylate (HEMA), N,N-dimethylacrylamide (DMA), methyl acrylic acid (MAA), acrylic acid, glycidyl methacrylate (GMA), (methyl)acrylamide, 2-(N,N-dimethylamino) ethyl methacrylate (DMAEMA), In an embodiment of the present invention, the hydrophilic monomer is a combination of HEMA and DMA. In this embodiment, the first siloxane macromer is present at an amount of 5 to 25 parts by weight, the second siloxane macromer is present at an amount of 30 to 40 parts by weight, HEMA is present at an amount of 10 to 30 parts by weight, DMA is present at an amount of 25 to 50 parts by weight and the initiator is present at an amount of 0.5 to 0.7 parts by weight based on the total amount of the composition.

In another embodiment of the present invention, the hydrophilic monomer is a combination of NVP, HEMA and DMA. In this embodiment, the first siloxane macromer is present at an amount of 5 to 10 parts by weight, the second siloxane macromer of is present at an amount of 30 to 50 parts by weight, NVP is present at an amount of 20 to 50 parts by weight, HEMA is present at an amount of 5 to 15 parts by weight, DMA is present at an amount of 4 to 15 parts by weight and the initiator is present at an amount of 0.5 to 0.7 parts by weight based on the total amount of the composition.

In an embodiment of the present invention, the composition for manufacturing contact lenses further includes a crosslinking agent. In this embodiment, the first siloxane macromer is present at an amount of 5 to 35 parts by weight, the second siloxane macromer is present at an amount of 30 to 50 parts by weight, the hydrophilic monomer is present at an amount of 5 to 50 parts by weight, preferable in 30 to 50 parts by weight, the initiator is present at an amount of 0.5 to 0.7 parts by weight and the crosslinking agent is present at an amount of 0.1 to 5 parts by weight based on the total amount of the composition.

Moreover, the crosslinking agent suitably used in conventional compositions for manufacturing contact lenses can be used in the method of the present invention, such as, for example, ethylene glycol dimethacrylate (EGDMA), tetraethylene ethylene glycol dimethacrylate (TEGDMA), tetraethylene ethylene glycol dimethacrylate (TrEGDMA), Poly (ethylene glycol) dimethacrylate, trimethylolpropane trimethacrylate (TMPTA), vinyl methacrylate, ethylenediamine dimethyl acrylamide, glycerol dimethacrylate, triallyisoeyanurate or triallyl cyanurate.

In an embodiment of the present invention, the composition for manufacturing contact lenses further includes a crosslinking agent and the hydrophilic monomer is a combination of NVP and DMA. In this embodiment, the first siloxane macromer is present at an amount of 25 to 35 parts by weight, the second siloxane macromer is present at an amount of 25 to 35 parts by weight, NVP is present at an amount of 25 to 35 parts by weight, DMA is present at an amount of 5 to 10 parts by weight, the initiator is present at an amount of 0.5 to 0.7 parts by weight and the crosslinking agent is present at an amount of 0.1 to 5 parts by weight based on the total amount of the composition.

In an embodiment of the present invention, the composition for manufacturing contact lenses further includes a crosslinking agent, wherein the hydrophilic monomer is a combination of NVP, HEMA and DMA. In this embodiment, the first siloxane macromer is present at an amount of 5 to 15 parts by weight, the second siloxane macromer of is present at an amount of 40 to 50 parts by weight, NVP is present at an amount of 0.1 to 10 parts by weight, HEMA is present at an amount of 5 to 15 parts by weight DMA is present at an amount of 25 to 35 parts by weight, the initiator is present at an amount of 0.5 to 0.7 parts, and the crosslinking agent is present at an amount of 0.1 to 5 parts by weight based on the total amount of the composition.

In addition, the composition for manufacturing contact lenses can further comprises but not limited to a dye and/or a UV-blocking agent.

According to a further aspect of the present invention, a method for manufacturing contact lenses is provided. The present method can comprise but not limited to the following steps:

Firstly, a first siloxane macromer, a second siloxane macromer, at least one hydrophilic monomer and an initiator are mixed to form a mixture. The number average molecular weight of the first siloxane macromer represented by formula (I), is 1,000 to 10,000 and the first siloxane macromer has a cross-linking function. The formula (I) is shown as follows:

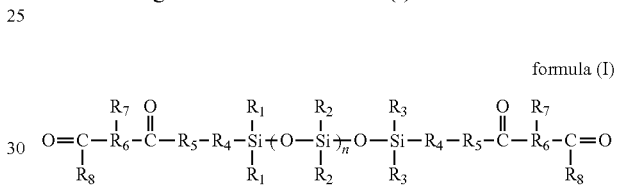

formula (I)

Moreover, the second siloxane macromer is selected from the group consisting of a siloxane macromer represented by the following formula (II) and a siloxane macromer represented by the following formula (III), wherein the formula (II) and formula (III) are shown as follows:

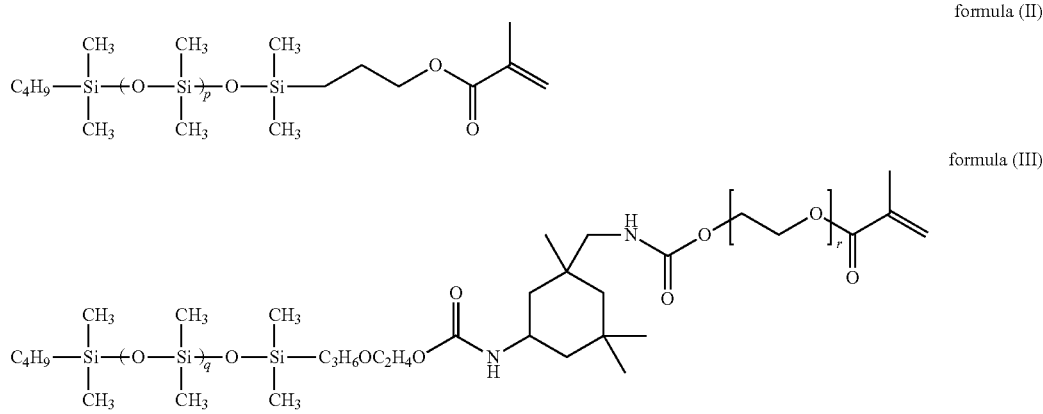

formula (II)

formula (III)

in formula (I), $R_1$, $R_2$ and $R_3$ are independently $C_1$-$C_4$ alkyl group, $R_4$ is $C_1$-$C_6$ alkenylene group, $C_1$-$C_6$ alkylene group, or $C_1$-$C_6$ alkylene substituted with ether group, $R_5$ is O or NH, $R_6$ is $C_1$-$C_6$ alkenylene group, $C_1$-$C_6$ alkylene group or $C_1$-$C_6$ alkylene substituted with ether group, $R_7$ is H, $C_1$-$C_6$ alkylene group or $C_1$-$C_6$ alkylene substituted with ether group, $R_8$ is a residue of reactive functional group with hydroxyl group, carboxyl group, epoxy group or acid anhydride group, and n is a integer of 10 to 100. In formula (II), p is an integer Of 4 to 80, and in formula (III), q is an integer of 4 to 80 and r is an integer of 3 to 40;

In the composition for manufacturing contact lenses, the first siloxane macromer is present at an amount of 5 to 35 parts by weight, the second siloxane macromer is present at an amount of 30 to 50 parts by weight, the hydrophilic monomer is present at an amount of 5 to 60 parts by weight, preferable in 30 to 60 parts by weight, and the initiator is present at 5 to 65 parts by weight at an amount of 0.5 to 0.7 parts by weight based on the total amount of the composition.

In an embodiment of the present invention, the first siloxane macromer comprises a siloxane macromer represented by the following formula (IV) or a siloxane macromer represented by the following formula (V):

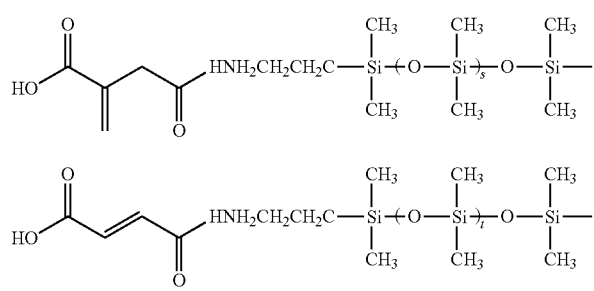
formula (IV)

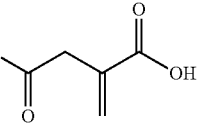

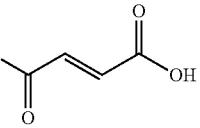
formula (V)

wherein in formula (IV), s is an integer of 10 to 100, and in formula (V), t is an integer of 10 to 100.

The hydrophilic monomer is selected from a group consisting of N-vinylpyrrolidone (NVP), 2-hydroxyethyl methacrylate (HEMA), N,N-dimethylacrylamide (DMA), methyl acrylic acid, acrylic acid, glycidyl methacrylate (GMA), (methyl)acrylamide, 2-(N,N-dimethylamino) ethyl methacrylate (DMAEMA), vinyl acetate, 2-(Dimethylamino)ethyl methacrylate, N-acrylolmorpholine and a combination thereof.

In an embodiment of the present invention, the hydrophilic monomer is a combination of HEMA and NVP, a combination of HEMA and DMA, a combination of NVP and DMA or a combination of a NVP. HEMA and DMA.

Besides, the initiator suitably used for manufacturing contact lenses in the present invention, can be a thermal initiator or a photoinitiator. The suitable thermal initiator, can be not limited to, such as, for example, azobisisoheptonitrile, 2,2'-azobis(isobutyronitrile) (AIBN), 2,2'-azobis(2,4-dimethylvaleronitrile), 2,2'-azobis(2-methyl-propanenitrile), 2,2'-azobis(2-methyl-butanenitrile). The suitable photoinitiator, can be not limited to, such as, for example, 2-Hydroxy-2-methylpropiophenone, 1-Hydroxycyclohexyl phenyl ketone, 2,2-Dimethoxy-2-phenylacetophenone, Benzoin methyl ether, 2,2'-azobis-isobutyronitrile or 2,2-Diethoxyacetophenone.

In an embodiment of the present invention, the composition for manufacturing contact lenses further includes a crosslinking agent, In the embodiment, the first siloxane macromer is present at an amount of 5 to 35 parts by weight, the second siloxane macromer is present at an amount of 30 to 50 parts by weight, the hydrophilic monomer is present at an amount of 5 to 50 parts by weight, preferable in 30 to 50 parts by weight, the initiator is present at an amount of 0.5 to 01 parts by weight and the crosslinking agent is present at an amount of 0.1 to 5 parts by weight based on the total amount of the composition.

Moreover, the crosslinking agent suitably used in conventional compositions for manufacturing contact lenses can be used in the method of the present invention, such as, for example, ethylene glycol dimethacrylate (EGDMA), tetraethylene ethylene glycol dimethacrylate (TEGDMA), tetraethylene ethylene glycol dimethacrylate (TrEGDMA), Poly (ethylene glycol) dimethacrylate, trimethyloipropane trimethacrylate (TMPTA), vinyl methacrylate, ethylenediamine dimethyl acrylamide, glycerol dimethacrylate, triallyisoeyanurate or triallyl cyanurate.

In addition, the composition for manufacturing contact lenses can further comprises other materials selectively, the material can be but not limited to a dye and/or a UV-blocking agent.

In the method of the present invention, after formation of the mixture, the mixture is injected into a mold of contact lens and conducted a UV irradiating treatment or a thermal treatment to form contact lenses.

In an embodiment of the method of the present method, the thermal treatment is conducted at temperature in the range between about 60° C. to about 120° C., and the reaction time is in the range from about 1 hour to 12 hours. In an embodiment of the method of the present invention, the thermal treatment is conducted at 80° C. for 10 hours.

In an embodiment of the method of the present method, an accumulated energy during the UV irradiating treatment is about 2 mW/cm$^2$ to 3 mW/cm$^2$ for 1 hours.

After forming contact lenses, the method of the present invention can further comprises a hydration treatment. In an embodiment of the method of the present invention, the hydration treatment comprises but not limited to the following steps.

Firstly, the contact lenses are soaked in alcohol solution, then soaked in water, and finally soaked in a buffer solution to reach equilibria. The buffer solution is, for example, a buffered Saline.

According to a further another aspect of the present invention, a contact lens obtained by the method mentioned above is provided.

Additionally, the oxygen permeability of the contact lenses according to the present invention is more than 80, and preferably more than 150.

The water content of the contact lenses according to the present invention is more than 30%. In another embodiment of the present invention, the water content of the contact lenses is in the range about 30% to 60%.

The present invention will be explained in further detail with reference to the examples. However, the present invention is not limited to these examples.

EXAMPLE

1. Preparation of Siloxane Macromers
(1) Preparation of Siloxane Macromer (A)
(I) The Reaction Scheme of Siloxane Macromer (A) is Shown as Follow:

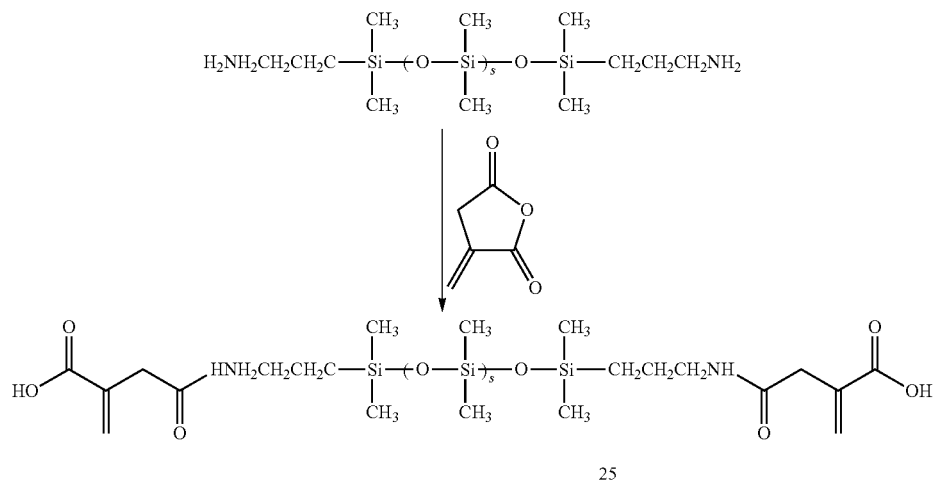

(II) Preparation of Siloxane Macromer (A)

20 g of aminopropyl terminated polydimethyl loxane (Mw. 1000, 0.02 mole, commercial code DMS-A12, from Gelest), 4.5 g of itaconic anhydride (0.0401 mole) and 40 mL of methylene chloride were added to a flask to form a solution, then the solution was stirred at room temperature. After the solution is stirred at room temperature for 12 hours, the resulting reaction product was washed with a large amount of water, and then dehydrated and filtered to obtain a raw product. Then, the methylene chloride was evaporated to obtain a siloxane macromer (A) (Mw. 1200).

(III) The Properties of Siloxane Macrame (A)

NMR Spectroscopy:
The results of analysis of $^1$H-NMR exhibited as follows:
1H-NMR (400 MHz, CDCl$_3$) δ 6.36(s, 1H), 5.82 (a, 1H) 3.39-3.21 (m, 4 H), 1.62-1.42 (m, 2H) 0.62-0.47 (m, 2H), 0.19-0.02 (Si—CH$_3$)

IR Spectroscopy:
(i) Absorption bands derived from Si—CH$_3$, at 802 cm$^{-1}$ and 1259 cm$^{-1}$.
(ii) An absorption band derived from Si—O—Si at 1032 cm$^{-1}$ and 1100 cm$^{-1}$ (2) Preparation of Siloxane Macromer (B)
(I) The Reaction Scheme of Siloxane Macromer (B) is Shown as Follow:

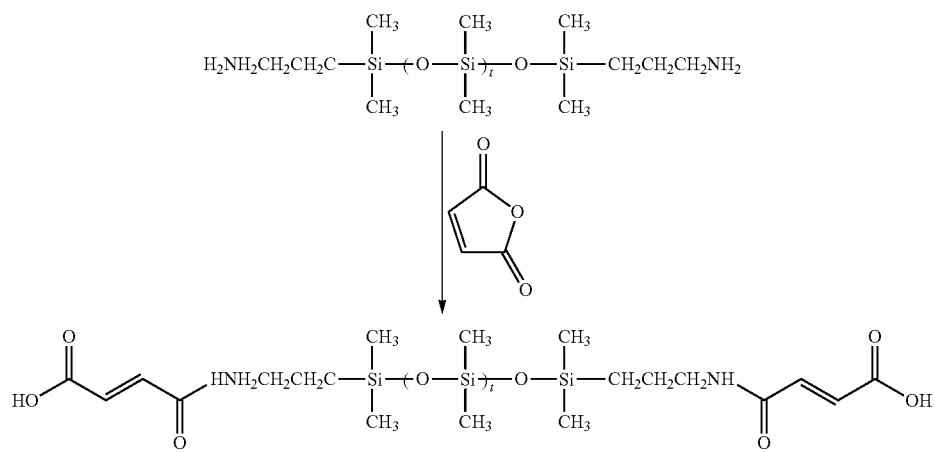

(II) Preparation of Siloxane Macromer (B)

20 g of aminopropyl terminated polydimethylsiloxane (Mw. 1000, 0.02 mole, commercial code DMS-A12, from Gelest), 4.02 g of maleic anhydride (0.0401 mole) and 40 mL of methylene chloride were added to a flask to form a solution, then the solution was stirred at room temperature. After the solution is stirred at room temperature for 12 hours, the resulting reaction product was washed with a large amount of water, and then dehydrated and filtered to obtain a raw product. Then, the methylene chloride was evaporated to obtain a siloxane macromer (B) (Mw. 1200).

(III) The Properties of Siloxane Macromer (B)

NMR Spectroscopy:

The results of analysis of $^1$H-NMR exhibited as follows:
1H-NMR (400 MHz, CDCl$_3$), δ 6.32 (s, 2H), 3.35-3.20 (m, 2H), 1.68-1.57 m, 2H), 0.67-0.48 (m, 2H), 0.19-0.02 (Si—CH$_3$)

IR Spectroscopy:

(i) Absorption bands derived from Si—CH$_3$ at 802 cm$^{-1}$ and 1259 e (ii) An absorption band derived from Si—O—Si at 1032 cm$^{-1}$ and 1100 m$^{-1}$ (3) Siloxane macromer (C1) is available from Gelest, commercial code MCR-M11 (Mw. 800-1000).

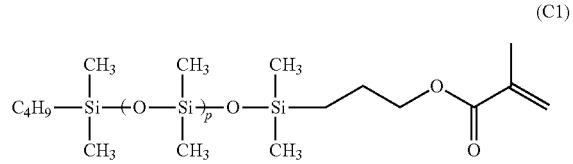

(C1)

(4) Preparation of Siloxane Macromer (C2)

(I) The Reaction Scheme of Siloxane Macromer (C2) is Shown as Follow:

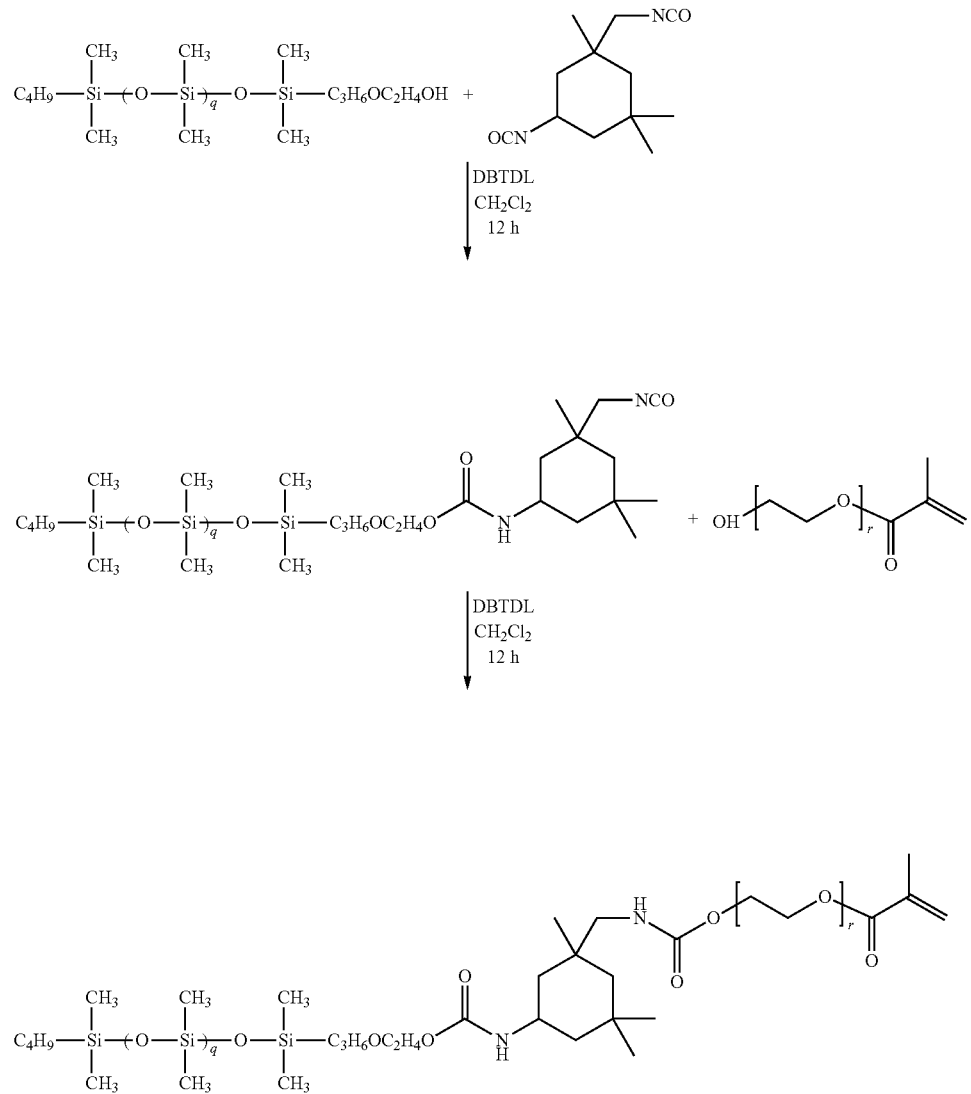

(II) Preparation of Siloxane Macromer (C2)

4.44 g of isophorone diisocyanate, 0.0025 g of dibutyltin dilaurate as the catalyst, and 40 mL of methylene chloride were added to a flask, and the solution was stirred under a stream of nitrogen. Then, 20 g of monocarbinol terminated polydimethylsiloxane (Mw. 1000, commercial code, MCR-C12, from Gelest) was accurately weighed and added dropwise to the solution over about 1 hour. After the solution reacting at room temperature for 12 hours, another 0.0025 g of dibutyltin dilaurate and 7.2 g of polyethylene glycol monomethacrylate (r=10, Mw. 526) were accurately weighed and added dropwise to the solution over about 1 hour. After the solution reacting at room temperature for another 12 hours, the resulting reaction product was washed with a large amount of water, and then dehydrated and filtered to obtain a raw product. Then, the methylene chloride was evaporated to obtain a siloxane macromer (C2) (Mw. 1700).

2. Preparation of Contact Lenses
(1) The Preparation Steps

The preparation of the contact lenses of Example 1-Example 10 are described in detail as follows and the weight percentages of reactants are shown in Table 1 and Table 2.

(I) The Preparation of the Contact Lenses of Example 1

A siloxane macromer (A), a siloxane macromer (C1), 2-hydroxyethyl methacrylate (HEMA) and N,N-dimethylacrylamide (DMA), a photoinitiator, 2-Hydroxy-2-methylpropiophenone (trade name, Da rocur 1173) and ethanol were mixed at the amounts shown in Table 1 and stirred about 1 hour.

Then, the mixtures were injected into a mold of contact lens made of polypropylene (PP) and conducted a UV irradiating treatment with an accumulated energy of 2 to 3 mW/cm$^2$ for 1 hour.

After the polymerization was completed, the mold was immersed in isopropyl alcohol solution for 1 hour and the resulting molded lens was taken out of the mold. The resulting lens was immersed in heated water for 4 hours and then immersed in a buffer solution to reach equilibrium.

(II) The Preparation of the Contact Lenses of Example 2

A siloxane macromer (B), a siloxane macromer (C2), 2-hydroxyethyl methacrylate (HEMA) and N,N-dimethylacrylamide (DMA), a photoinitiator, 2-Hydroxy-2-methylpropiophenone (trade name, Darocur 1173) and ethanol were mixed at the amounts shown in Table 1 and stirred about 1 hour.

Then, the mixtures were injected into a mold of contact lens made of polypropylene (PP) and conducted a UV irradiating treatment with an accumulated energy of 2 to 3 mW/cm$^2$ for 1 hour, After the polymerization was completed, the mold was immersed in isopropyl alcohol solution for 1 hour and the resulting molded lens was taken out of the mold. The resulting lens was immersed in heated water for 4 hours and then immersed in a buffer solution to reach equilibrium.

(III) The Preparation of the Contact Lenses of Example 3

A siloxane macromer (A), a siloxane macromer (C2), N-vinylpyrrodine to (NVP) and N,N-dimethylacrylamide (DMA), a crosslinking agent, ethylene glycol dimethacrylate (EGDMA), a photoinitiator, 2-Hydroxy-2-methylpropiophenone (trade name, Darocur 1173) and ethanol were mixed at the amounts shown in Table 1 and stirred about 1 hour.

Then, the mixtures were injected into a mold of contact lens made of polypropylene (PP) and conducted a UV irradiating treatment with an accumulated energy of 2 to 3 mW/cm$^2$ for 1 hour.

After the polymerization was completed, the mold was immersed in isopropyl alcohol solution for 1 hour and the resulting molded lens was taken out of the mold. The resulting lens was immersed in heated water for 4 hours and then immersed in a buffer solution to reach equilibrium.

(IV) The Preparation of the Contact Lenses of Example 4

A siloxane macromer (A), a siloxane macromer (C1), N-vinylpyrrodine (NVP) and N,N-dimethylacrylamide (DMA), 2-hydroxyethyl methacrylate (HEMA), a thermal initiator, 2-2'-azobis(isobutyronitrile) (AIBN) and hexanol were mixed at the amounts shown in Table 1 and stirred about 1 hour.

Then, the mixtures were injected into a mold of contact lens made of polypropylene (PP) and heated to initiate the radical polymerization thererof at 80° C. for 10 hrs.

After the polymerization was completed, the mold was immersed in isopropyl alcohol solution for 1 hour and the resulting molded lens was taken out of the mold. The resulting lens was immersed in heated water at 80° C. for 4 hours and then immersed in a buffer solution to reach equilibrium.

(V) The Preparation of the Contact Lenses of Example 5

A siloxane macromer (A), a siloxane macromer (C1), N-vinylpyrrodine to (NVP), N,N-dimethylacrylamide (DMA), 2-hydroxyethyl methacrylate (HEMA), a thermal initiator, 2-2'-azobis(isobutyronitrile) (AIBN) and hexanol were mixed at the amounts shown in Table 1 and stirred about 1 hour.

Then, the mixtures were injected into a mold of contact lens made of polypropylene (PP) and heated to initiate the radical polymerization thererof at 80° C. for 10 hrs.

After the polymerization was completed, the mold was immersed in isopropyl alcohol solution for 1 hour and the resulting molded lens was taken out of the mold. The resulting lens was immersed in heated water for 4 hours and then immersed in a buffer solution to reach equilibrium.

(VI) The Preparation of the Contact Lenses of Example 6

A siloxane macromer (A), a siloxane macromer (C1), N-vinylpyrrodine (NVP), N,N-dimethylacrylamide (DMA), 2-hydroxyethyl methacrylate (HEMA), a crosslinking agent, ethylene glycol dimethacrylate (EGDMA), a thermal initiator, 2-2'-azobis(isobutyronitrile) (AIBN) and hexanol were mixed at the amounts shown in Table 2 and stirred about 1 hour.

Then, the mixtures were injected into a mold of contact lens made of polypropylene (PP) and heated to initiate the radical polymerization thererof at 80° C. for 10 hrs.

After the polymerization was completed, the mold was immersed in 80% isopropyl alcohol solution for 1 hour and the resulting molded lens was taken out of the mold. The resulting lens was immersed in heated water for 4 hours and then immersed in a buffer solution to reach equilibrium.

(VII) The Preparation of the Contact Lenses of Example 7

A siloxane macromer (A), a siloxane macromer (C1), N,N-dimethylacrylamide (DMA), 2-hydroxyethyl methacrylate (HEMA), a thermal initiator, 2-2'-azobis(isobutyronitrile) (AIBN) and hexanol were mixed at the amounts shown in Table 2 and stirred about 1 hour.

Then, the mixtures were injected into a mold of contact lens made of polypropylene (PP) and heated to initiate the radical polymerization thereof at 80° C. for 10 hrs.

After the polymerization was completed, the mold was immersed in isopropyl alcohol solution for 1 hour and the resulting molded lens was taken out of the mold. The resulting lens was immersed in heated water at 80° C. for 4 hours and then immersed in a buffer solution to reach equilibrium.

(VIII) The Preparation of the Contact Lenses of Example 8

A siloxane macromer (A), a siloxane macromer (C2), N-vinylpyrrodine (NVP), N,N-dimethylacrylamide (DMA), 2-hydroxyethyl methacrylate (HEMA), a thermal initiator, 2-2'-azobis(isobutyronitrile) (AIBN) and hexanol were mixed at the amounts shown in Table 2 and stirred about 1 hour.

Then, the mixtures were injected into a mold of contact lens made of polypropylene (PP) and heated to initiate the radical polymerization thererof at 80° C. for 10 hrs.

After the polymerization was completed, the mold was immersed in isopropyl alcohol solution for 1 hour and the resulting molded lens was taken out of the mold. The resulting lens was immersed in heated water at 80° C. for 4 hours and then immersed in a buffer solution to reach equilibrium.

(IX) The Preparation of the Contact Lenses of Example 9

A siloxane macromer (A), a siloxane macromer (C2), N,N-dimethylacrylamide (DMA), 2-hydroxyethyl methacrylate (HEMA), a thermal initiator, 2-2'-azobis(isobutyronitrile) (AIBN) and hexanol were mixed at the amounts shown in Table 2 and stirred about 1 hour.

Then, the mixtures were injected into a mold of contact lens made of polypropylene (PP) and heated to initiate the radical polymerization thererof at 80° C. for 10 hrs.

After the polymerization was completed, the mold was immersed in isopropyl alcohol solution for 1 hour and the resulting molded lens was taken out of the mold. The resulting lens was immersed in heated water at 80° C. for 4 hours and then immersed in a buffer solution to reach equilibrium.

(X) The Preparation of the Contact Lenses of Example 10

A siloxane macromer (A), a siloxane macromer (C2), N-vinylpyrrodine (NVP), N,N-d methylacrylamide (DMA), 2-hydroxyethyl methacrylate (HEMA), a thermal initiator, 2,2'-azobis(isobutyronitrile) (AIBN) and hexanol were mixed at the amounts shown in Table 2 and stirred about 1 hour.

Then, the mixtures were injected into a mold of contact lens made of polypropylene (PP) and heated to initiate the radical polymerization thererof at 80° C. for 10 hrs.

After the polymerization was completed, the mold was immersed in isopropyl alcohol solution for 1 hour and the resulting molded lens was taken out of the mold. The resulting lens was immersed in heated water for 4 hours and then immersed in a buffer solution to reach equilibrium.

TABLE 1

The composition of contact lenses of Example 1-Example 5

| Composition | Abbr. | Function | 1 | 2 | 3 | 4 | 5 |
|---|---|---|---|---|---|---|---|
| Siloxane macromer (A) | A | Siloxane monomer | 14.6 | | 30 | 7.1 | 5.8 |
| Siloxane macromer (B) | B | Siloxane monomer | | 24 | | | |
| Siloxane macromer (C1) | C1 | Slioxane monomer | 34.1 | | | 34.5 | 38.6 |
| Siloxane macromer (C2) | C2 | Siloxane monomer | | 32 | 30 | | |
| N-vinyl-pyrrolidone | NVP | Hydrophilic monomer | | | 30 | 47.2 | 41.5 |
| 2-hydroxyethyl methacrylate | HEMA | Hydrophilic monomer | 25.9 | 16.4 | | 6.5 | 7.3 |
| N,N-dimethyl acrylamide | DMA | Hydrophilic monomer | 25.4 | 27.6 | 9.7 | 4.7 | 6.8 |
| 2,2'-azobis-(iso-butyronitrile) | AIBN | Thermal initiator | | | | 0.7 | 0.7 |
| Darocur 1173 | | Photo initiator | 0.5 | 0.5 | 0.5 | | |
| Ethylene Glycol di-methacrylate | EGDMA | Cross linking agent | | | | 0.3 | |
| Hexanol | HeOH | Solvent | | | | 25 | 25 |
| Ethanol | EtOH | Solvent | 20 | 20 | 20 | | |

TABLE 2

The composition of contact enses of Example 6-Example 10

| Composition | Abbr. | Function | 6 | 7 | 8 | 9 | 10 |
|---|---|---|---|---|---|---|---|
| Siloxane Macromer (A) | A | Siloxane monomer | 10 | 15 | 6 | 8 | 7.1 |
| Siloxane macromer (B) | B | Siloxane monomer | | | | | |
| Siloxane macromer (C1) | C1 | Siloxane monomer | 45 | 38 | | | |
| Siloxane macromer (C2) | C2 | Siloxane monomer | | | 45 | 35 | 47.6 |
| N-vinyl-pyrrolidone | NVP | Hydrophilic monomer | 0.8 | | 20 | | 28.6 |
| 2-hydroxy-ethyl methacrylate | HEMA | Hydrophilic monomer | 10 | 14 | 14 | 10 | 8.4 |
| N,N-dimethyl acrylamide | DMA | Hydrophilic monomer | 30 | 33 | 15 | 47 | 8.3 |
| 2,2'-azobis-(iso-butyronitrile) | AIBN | Thermal initiator | 0.7 | 0.6 | 0.6 | 0.6 | 0.7 |
| Darocur 1173 | | Photo initiator | | | | | |
| Ethylene glycol di-methacrylate | EGDMA | Cross linking agent | 4.2 | | | | |
| Hexanol | HeOH | Solvent | 25 | 25 | 25 | 25 | 25 |
| Ethanol | EtOH | Solvent | | | | | |

(2) Physical Property Tests

The results of physical property tests of Comparative Example 1 (B&L, Pure Vision), Comparative Example 2 (Ciba, day and night) and Example 1-Example 10 of the present invention were shown as the following Table 3.

TABLE 3

The result of physical property tests

| Item | Example | | | | | | | | | | Comparative Example | |
|---|---|---|---|---|---|---|---|---|---|---|---|---|
| | 1 | 2 | 3 | 4 | 5 | 6 | 7 | 8 | 9 | 10 | 1 | 2 |
| Water content (%) | 38.8 | 34.9 | 42.2 | 34.8 | 55.5 | 34.9 | 36.3 | 43.3 | 34.4 | 55.5 | 36 | 24 |
| Modulus (MPa) | 0.53 | 0.42 | 0.85 | 0.63 | 0.39 | 0.5 | 0.61 | 0.65 | 0.63 | 0.34 | 1 | 1.2 |
| Tension (g) | 49 | 23 | 12 | 17 | 16 | 35 | 35 | 60 | 16.6 | 17 | 103 | 60 |
| Oxygen permeability (Dk) | 93 | 85 | 118 | 81 | 88 | 83 | 155 | 156 | 94 | 89 | 75 | 84 |

As shown in Table 3, the contact lenses according to the present invention have more excellent oxygen permeability than comparative examples, except Example 4 and Example 6. Moreover the oxygen permeability of Example 3, Example 7 and Example 8 are higher than 100, and the oxygen permeability of Example 7 and Example 8 is even up to 150. In addition, the water content of Example 3, Example 5, Example 8 and Example 10 are more than 40%, but the water content of Comparative Example 1 and Comparative Example 2 are only 36% and 24%, respectively.

According to the present invention, the contact lenses have more excellent oxygen permeability and water content than the conventional contact lenses.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A composition for manufacturing contact lenses comprising:
   a first siloxane macromer, represented by the following formula (I) having the number average molecular weight of the first siloxane macromer of formula (I) in a range of 1,000 to 10,000 and the first siloxane macromer with a cross-linking function,

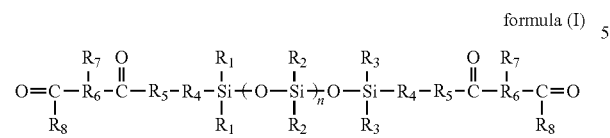

formula (I)

wherein $R_1$, $R_2$ and $R_3$ are independently $C_1$-$C_4$ alkyl groups, $R_4$ is $C_1$-$C_6$ alkenylene group, $C_1$-$C_6$ alkylene group, or $C_1$-$C_6$ alkylene substituted with ether group, $R_5$ is O or NH, $R_6$ is $C_1$-$C_6$ alkenylene group, $C_1$-$C_6$ alkylene group or $C_1$-$C_6$ alkylene substituted with ether group, $R_7$ is H, $C_1$-$C_6$ alkylene group or $C_1$-$C_6$ alkylene substituted with ether group, $R_8$ is a residue of reactive functional group with hydroxyl group, carboxyl group, epoxy group or acid anhydride group, and n is a integer of 10 to 100;
   a second siloxane macromer being selected from the group consisting of a siloxane macromer represented by the following formula (II) and a siloxane macromer represented by the following formula (III), wherein in formula (II), p is an integer of 4 to 80, and in formula (III), q is an integer of 4 to 80 and r is an integer of 3 to 40;

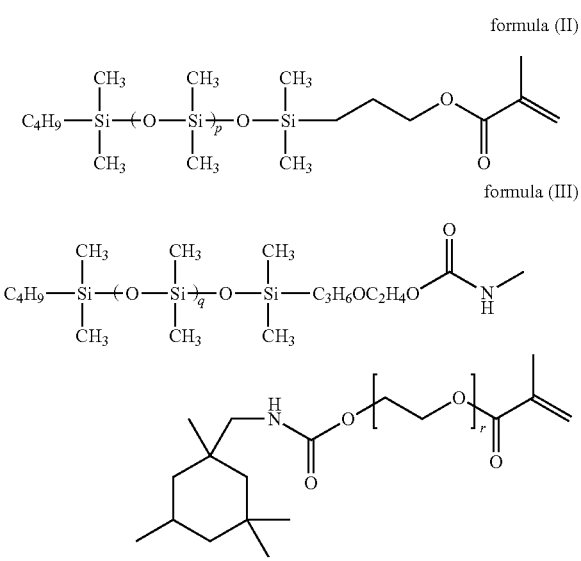

at least one hydrophilic monomer, wherein the hydrophilic monomer is selected from a group consisting of N-vinylpyrrolidone (NVP), 2-hydroxyethyl methacrylate (HEMA), N,N-dimethylacrylamide (DMA), methyl acrylic acid, acrylic acid, glycidyl methacrylate (GMA), (methyl)acrylamide, 2-(N,N-dimethylamino)ethyl methacrylate (DMAEMA), vinyl acetate, 2-(Dimethylamino)ethyl methacrylate, N-acrylolmorpholine and a combination thereof; and
   an initiator.

2. The composition for manufacturing contact lenses according to claim 1, wherein the first siloxane macromer of formula (I) is present at an amount of 5 to 35 parts by weight, the second siloxane macromer of formula (II) is present at an amount of 30 to 50 parts by weight, the hydrophilic monomer is present at an amount of 5 to 60 parts by weight and the initiator is present at an amount of 0.5 to 0.7 parts by weight based on the total amount of the composition.

3. The composition for manufacturing contact lenses according to claim 1, wherein the first siloxane macromer comprises a siloxane macromer represented by the following formula (IV) or a siloxane macromer represented by the following formula (V):

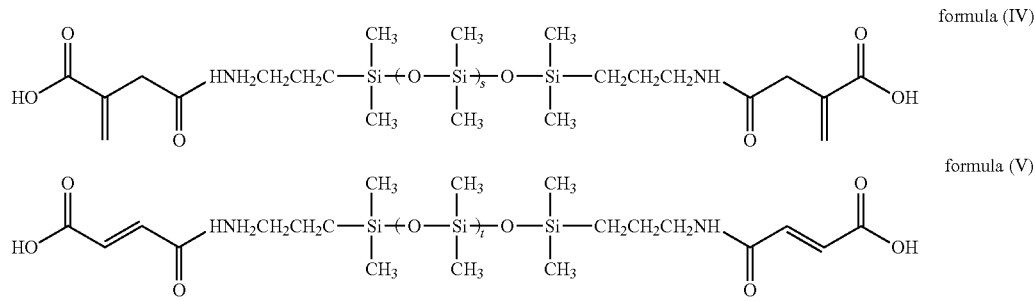

wherein in formula (IV), s is an integer of 10 to 100, and in formula (V), t is an integer of 10 to 100.

4. The composition for manufacturing contact lenses according to claim 1, wherein the hydrophilic monomer is a combination of 2-hydroxyethyl methacrylate (HEMA) and N-vinylpyrrolidone (NVP), a combination of 2-hydroxyethyl methacrylate (HEMA) and N,N-dimethylacrylamide (DMA), a combination of N-vinylpyrrolidone (NVP) and N,N-dimethylacrylamide (DMA) or a combination of a N-vinyipyrrolidone (NVP), 2-hydroxyethyl methacrylate (HEMA) and N,N-dimethylacrylamide (DMA).

5. The composition for manufacturing contact lenses according to claim 1, wherein the initiator is a thermal initiator selected from a group consisting of azobisisoheptonitrile, 2,2'-azobis(isobutyronitrile) (AIBN), 2,2'-azobis(2,4-dimethylvaleronitrile), 2,2'-azobis(2-methyl-propanenitrile), 2,2'-azobis(2-methyl-butanenitrile).

6. The composition for manufacturing contact lenses according to claim 1, wherein the initiator is a photoinitiator selected from a group consisting of 2-Hydroxy-2-methylpropiophenone, 1-Hydroxycyclohexyl phenyl ketone, 2,2-Dimethoxy-2-phenylacetophenone, Benzoin methyl ether, 2,2'-azobis-isobutyronitrile or 2,2-Diethoxyacetophenone.

7. The composition for manufacturing contact lenses according to claim 1, wherein the hydrophilic monomer is a combination of HEMA and DMA.

8. The composition for manufacturing contact lenses according to claim 7, wherein the first siloxane macromer is present at an amount of 5 to 25 parts by weight, the second siloxane macromer is present at an amount of 30 to 40 parts by weight, HEMA is present at an amount of 10 to 30 parts by weight, DMA is present at an amount of 25 to 50 parts by weight and the initiator is present at an amount of 0.5 to 0.7 parts by weight based on the total amount of the composition.

9. The composition for manufacturing contact lenses according to claim 1, wherein the hydrophilic monomer is a combination of NVP, HEMA and DMA.

10. The composition for manufacturing contact lenses according to claim 9, wherein the first siloxane macromer is present at an amount of 5 to 10 parts by weight, the second siloxane macromer of is present at an amount of 30 to 50 parts by weight, NVP is present at an amount of 20 to 50 parts by weight, HEMA is present at an amount of 5 to 15 parts by weight, DMA is present at an amount of 4 to 15 parts by weight and the initiator is present at an amount of 0.5 to 0.7 parts by weight based on the total amount of the composition.

11. The composition for manufacturing contact lenses according to claim 1, further includes a crosslinking agent.

12. The composition for manufacturing contact lenses according to claim 11, wherein the first siloxane macromer is present at an amount of 5 to 35 parts by weight, the second siloxane macromer is present at an amount of 30 to 50 parts by weight, the hydrophilic monomer is present at an amount of 5 to 50 parts by weight, the initiator is present at an amount of 0.5 to 0.7 parts by weight and the crosslinking agent is present at an amount of 0.1 to 5 parts by weight based on the total amount of the composition.

13. The composition for manufacturing contact lenses according to claim 11, wherein the crosslinking agent is selected from a group consisting of ethylene glycol dimethacrylate (EGDMA), tetraethylene ethylene glycol dimethacrylate (TEGDMA), tetraethylene ethylene glycol dimethacrylate (TrEGDMA), Poly(ethylene glycol) dimethacrylate, trimethylolpropane trimethacrylate (TMPTA), vinyl methacrylate, ethylenediamine dimethyl acrylamide, glycerol dimethacrylate, triallyisoeyanurate and triallyl cyanurate.

14. The composition for manufacturing contact lenses according to claim 11, wherein the hydrophilic monomer is a combination of NVP and DMA, the first siloxane macromer is present at an amount of 25 to 35 parts by weight, the second siloxane macromer is present at an amount of 25 to 35 parts by weight, NVP is present at an amount of 25 to 35 parts by weight, DMA is present at an amount of 5 to 10 parts by weight, the initiator is present at an amount of 0.5 to 0.7 parts by weight and the crosslinking agent is present at an amount of 0.1 to 5 parts by weight based on the total amount of the composition.

15. The composition for manufacturing contact lenses according to claim 11, wherein the hydrophilic monomer is a combination of NVP, HEMA and DMA, the first siloxane macromer is present at an amount of 5 to 15 parts by weight, the second siloxane macromer is present at an amount of 40 to 50 parts by weight, NVP is present at an amount of 0.1 to 1 parts by weight, HEMA is present at an amount of 5 to 15 parts by weight, DMA is present at an amount of 25 to 35 parts by weight, the initiator is present at an amount of 0.5 to 0.7 parts by weight and the crosslinking agent is present at an amount of 0.1 to 5 parts by weight based on the total amount of the composition.

16. The composition for manufacturing contact lenses according to claim 1, further includes a dye and/or an UV-blocking reagent.

* * * * *